United States Patent
Luginbill et al.

(10) Patent No.: US 6,616,206 B2
(45) Date of Patent: Sep. 9, 2003

(54) CENTER CONSOLE ASSEMBLY

(75) Inventors: Neal W. Luginbill, Marysville, OH (US); Frank Paluch, Dublin, OH (US); Michael Tsay, Irvine, CA (US); Chad Harrison, Hilliard, OH (US); Doug Fischer, Addison, OH (US); Taro Shimokobe, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/037,531

(22) Filed: Jan. 4, 2002

(65) Prior Publication Data

US 2003/0127877 A1 Jul. 10, 2003

(51) Int. Cl.7 ............................................. B60R 11/02
(52) U.S. Cl. ................ 296/37.8; 297/188.19; 224/539
(58) Field of Search .................. 296/37.8; 297/188.19, 297/188.14, 411.21; 224/539, 275

(56) References Cited

U.S. PATENT DOCUMENTS

| 5,397,160 A | * | 3/1995 | Landry ...................... 296/37.8 |
| 5,449,105 A | * | 9/1995 | Schiff et al. ............ 296/37.8 X |
| 6,168,059 B1 | * | 1/2001 | Salenbauch et al. ... 296/37.8 X |
| 6,367,857 B2 | * | 4/2002 | Kifer et al. ................. 296/24.1 |
| 6,419,314 B1 | * | 7/2002 | Scheerhorn ............ 297/188.19 |
| 6,499,785 B2 | * | 12/2002 | Eguchi ....................... 296/37.8 |
| 2001/0042658 A1 | * | 11/2001 | Allen ..................... 296/37.8 X |
| 2002/0057002 A1 | * | 5/2002 | Pegorier .................... 296/37.8 |

FOREIGN PATENT DOCUMENTS

JP   5-50875   * 3/1993

* cited by examiner

Primary Examiner—Joseph D. Pape
(74) Attorney, Agent, or Firm—Rankin, Hill, Porter & Clark LLP; Mark E. Duell (57) ABSTRACT

A center console assembly including a rear wall and a pair of sidewalls, the sidewalls being interconnected at a forward end thereof by a bar member assembly. The bar member assembly includes an upper bar member and a lower bar member. The upper bar member defines a first catch that a latch of an upper lid is releasably secured thereto. The lower bar member defines a second catch that a latch of a front panel assembly is secured thereto. The front panel assembly and sidewalls cooperate to releasably retain the front panel assembly in a partially open position or a full open position. The front panel assembly holds a mobile telephone and other small items, such stored items being accessible when the front panel assembly is in one of the open positions.

26 Claims, 7 Drawing Sheets

CENTER CONSOLE ASSEMBLY

BACKGROUND OF THE INVENTION

Center consoles are conventionally disposed between the front seats of an automobile, and include a pivotal upper cover to permit access to a storage space contained therein. Such center console assemblies are satisfactory for storage of large items, and items that are not needed during operation of the vehicle. However, for storage of items that may be used during operation of the vehicle, such as mobile portable telephones, the pivotal upper lid is problematic.

For example, U.S. Pat. No. 6,032,027 teaches a holding arrangement for a mobile telephone that is disposed within a storage space of a center console. The holding arrangement includes a phone holding body that is pivotally supported by a pair of arms. When the console cover is open the phone holding body may be rotated between a storage position at a bottom portion of the console storage space and a use position at the open top of the console. The holding body further includes a spring-loaded carriage which, when the holding body is in the use position, may be moved outwardly or forwardly so as to project away further away from the console and place the mobile phone held thereon in a more accessible position.

Center console assemblies as taught by the '027 patent work satisfactorily, but suffer from several disadvantages. First, the holding body is difficult for the user to access and pivotally manipulate from the storage position due to its disposition deep within the storage space of the center console. Second, the '027 phone holding assembly occupies an inordinate amount of space within the center console storage space, and greatly reduces the available capacity of the storage space. Finally, the telephone held by the '027 phone holding assembly is only accessible when the console cover is open and, as such, may be uncomfortable to the driver and passenger.

Therefore, there exists a need in the art for a center console assembly that will permit improved access to stored items, such as mobile telephones, and that will permit storage of such items in a manner that will not significantly obstruct the useful storage space within the center console.

SUMMARY OF THE INVENTION

The present invention is directed toward a multi-functional center console assembly for an automobile that will permit improved access to stored items, such as mobile telephones, and that will permit storage of such items in a manner that will not significantly obstruct the useful storage space within the center console.

In accordance with the present invention, a center console assembly includes a pair of sidewalls and a rear wall connected to the sidewalls. The sidewalls are interconnected by a bar member assembly that acts as a support member and a coin holder.

In further accordance with the present invention, an upper lid is pivotally secured to the rear wall and a front panel assembly is pivotally secured to the sidewalls. The upper lid includes a latch that is releasably secured to a first catch provided by the bar member assembly. The front panel assembly includes a latch that is releasably secured to a second catch of the bar member assembly.

In further accordance with the present invention, the bar member assembly includes an upper bar member and a lower bar member, and the lower bar member is nested with the upper member. The upper bar member provides the first catch and the lower bar member provides the second catch.

In further accordance with the present invention, the front panel assembly includes a front panel member having a pair of hinge arms, each of said hinge arms extending through an opening in an associated one of said pair of sidewalls. The hinge arms and the sidewalls cooperate to define means for releasably holding said front panel assembly in a partially opened position. Each of the hinge arms have a first and second detents disposed at predetermined positions along the length of the hinge arms, and the sidewalls have a tab secured thereto adjacent the opening. The first detents engage the tab to retain the front panel assembly in a partially opened position while the second detents engage the tab to retain the front panel assembly in a full open position.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
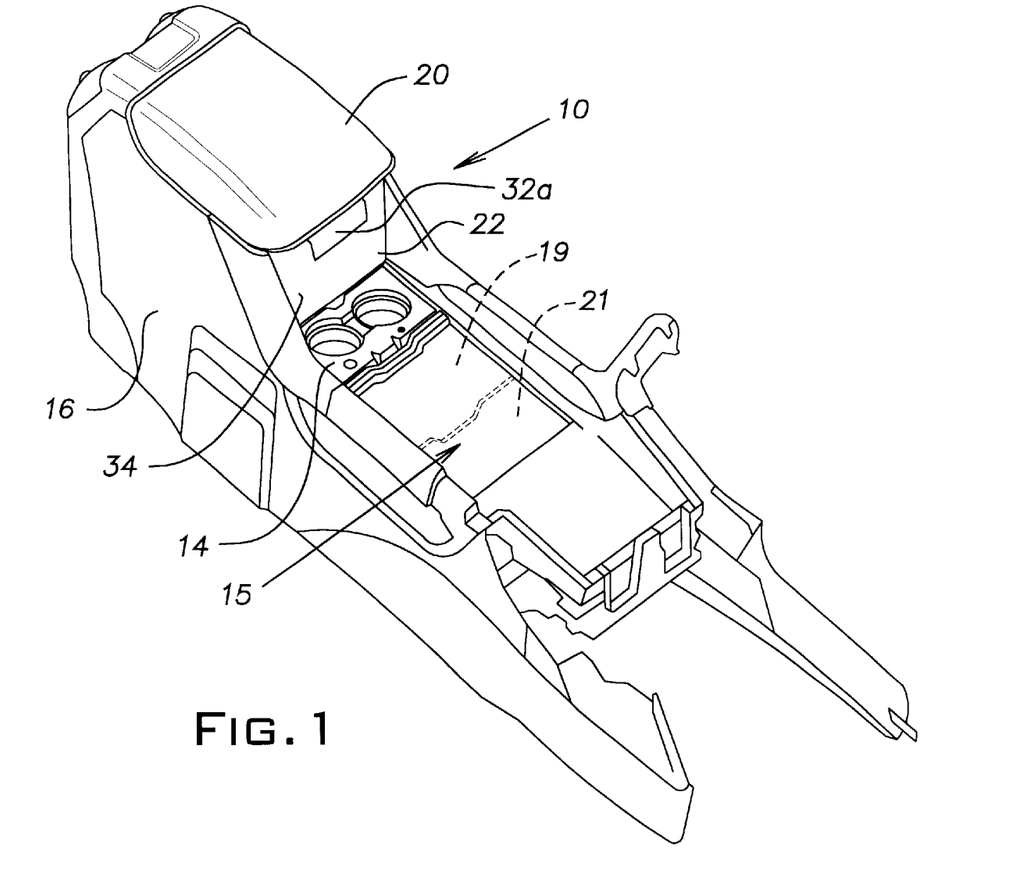
FIG. 1 is a perspective view of a center console with an upper lid and front panel assembly shown in a closed position.
Figure 2:
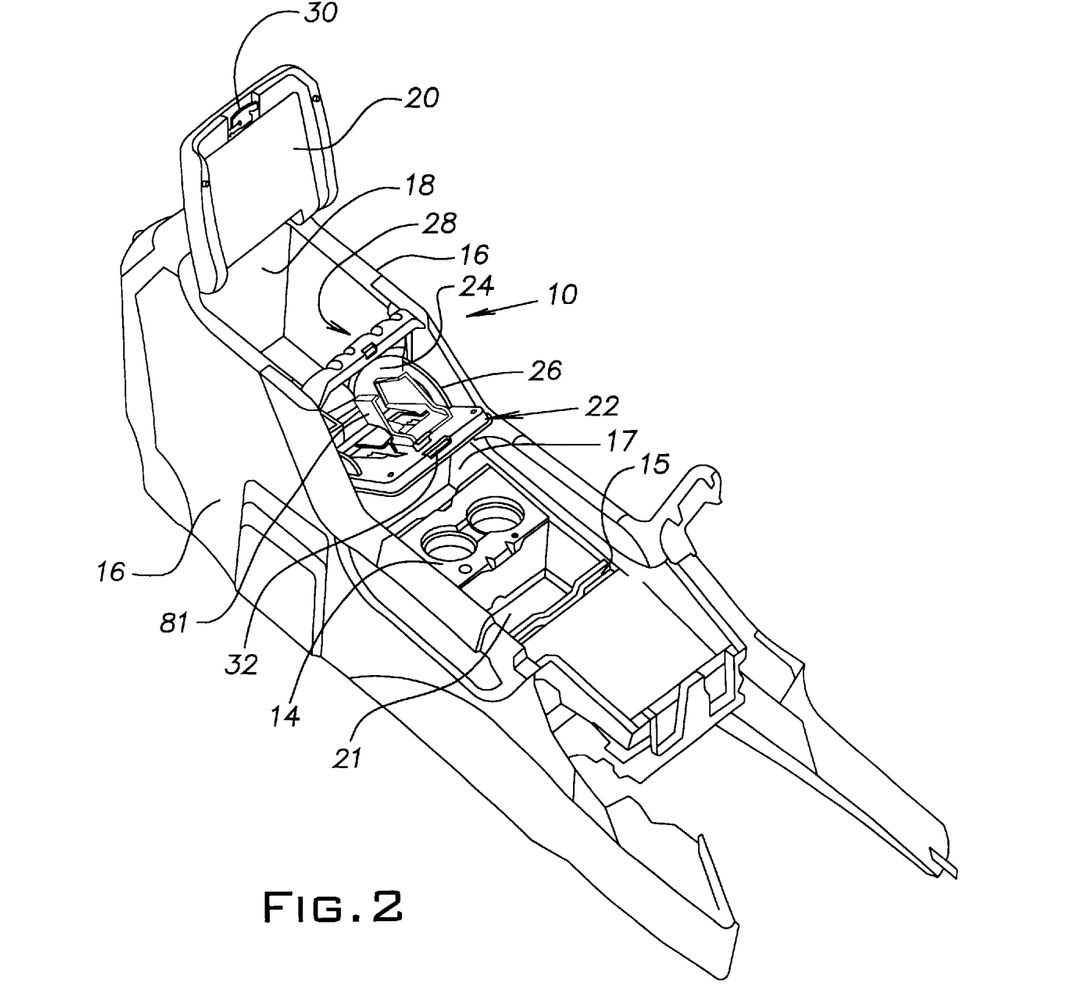
FIG. 2 is a perspective view similar to FIG. 1, but with the front panel assembly and upper lid in an open position.

With reference to FIGS. 1 and 2, a center console 10 according to the present invention is shown. The center console 10 is preferably disposed between the driver's seat and the passenger's seat in the front of a vehicle, and includes a storage compartment, a sliding cover 15, and a series of storage spaces 17, 19, 21.

The storage spaces include a rearward space 17, a middle space 19, and a relatively deeper or recessed forward space 21 The forward storage space provides a relatively large volume of available space that is conveniently located to receive large items, such as purses.

The middle and forward storage spaces 19, 21 are selectively revealed/covered by opening/closing the sliding cover 15, it being noted that the forward storage space 21 is partially concealed by the sliding cover 15 when the cover is open, as shown in FIG. 2. The sliding cover 15 is movable between the open and closed positions and preferably is latched in the closed position.

The rearward and middle storage spaces 17, 19 are adapted to receive a removable cup holder 14. Permitting the cup holder 14 to be removed and repositioned within the center console offers several advantages. For example, when the cup holder 14 is received in the rearward storage space 17, items may be stored in the middle storage space 19 and optionally concealed by the sliding cover 15. However, when a front panel assembly 22 of the console 10 is opened, the cup holder may be advantageously moved to the middle storage space 19 to prevent interference between beverages received in the cup holder 14 and the front panel assembly 22. In this case, items may be received in the rearward storage space 17 and covered, either partially or fully depending upon the orientation of the front panel assembly. Naturally, if beverages are not disposed in the cup holder 14, the front panel assembly 22 may be freely opened without moving the cup holder from the rearward storage space 17 to the middle storage space 19.

A central body member of the console 10 has a pair of sidewalls 16, a rear wall 18, an upper lid 20, and the front panel assembly 22 that cooperate to define the storage compartment. Preferably, the rear wall 18 and sidewalls 16 are integrally formed to provide a unitary structure. The sidewalls 16 define spaces into which hinge arms 26 extending from the front panel assembly 22 are received. Preferably, the spaces are curved or arcuate pockets 24 that have forwardly facing openings through which the hinge arms 26 extend, as will be described hereinafter.

The upper and forward ends of the sidewalls 16 are interconnected by a bar member assembly 28, which defines first and second catches 29, 31. The first catch 29 releasably receives a latch 30 of the upper lid 20 to secure the upper lid 20 in the closed position while the second catch 31 releasably receives a latch 32 of the front panel assembly 22 to secure the front panel assembly 22 in the closed position.

Preferably, an electrical accessory power connection or socket 33 is provided within the storage compartment of the center console 10 to permit convenient access to electrical power for a mobile phone stored in the front panel assembly 22. As will be appreciated, the socket 33 is disposed just behind the front panel assembly 22 so as to be accessible for connection to a mobile phone disposed thereon.

More specifically, the mobile phone power cord (not shown) will be received within the storage compartment of the center console and, as such, will not obstruct movement of the passengers, clutter the passenger compartment, or occupy the storage spaces 17, 19, 21 provided elsewhere by the by the console. Thus, providing the dedicated socket permits the power cord to be in a stored and safe position, while being readily accessible for connection to the mobile phone disposed on the front panel assembly 22.

Figure 4:
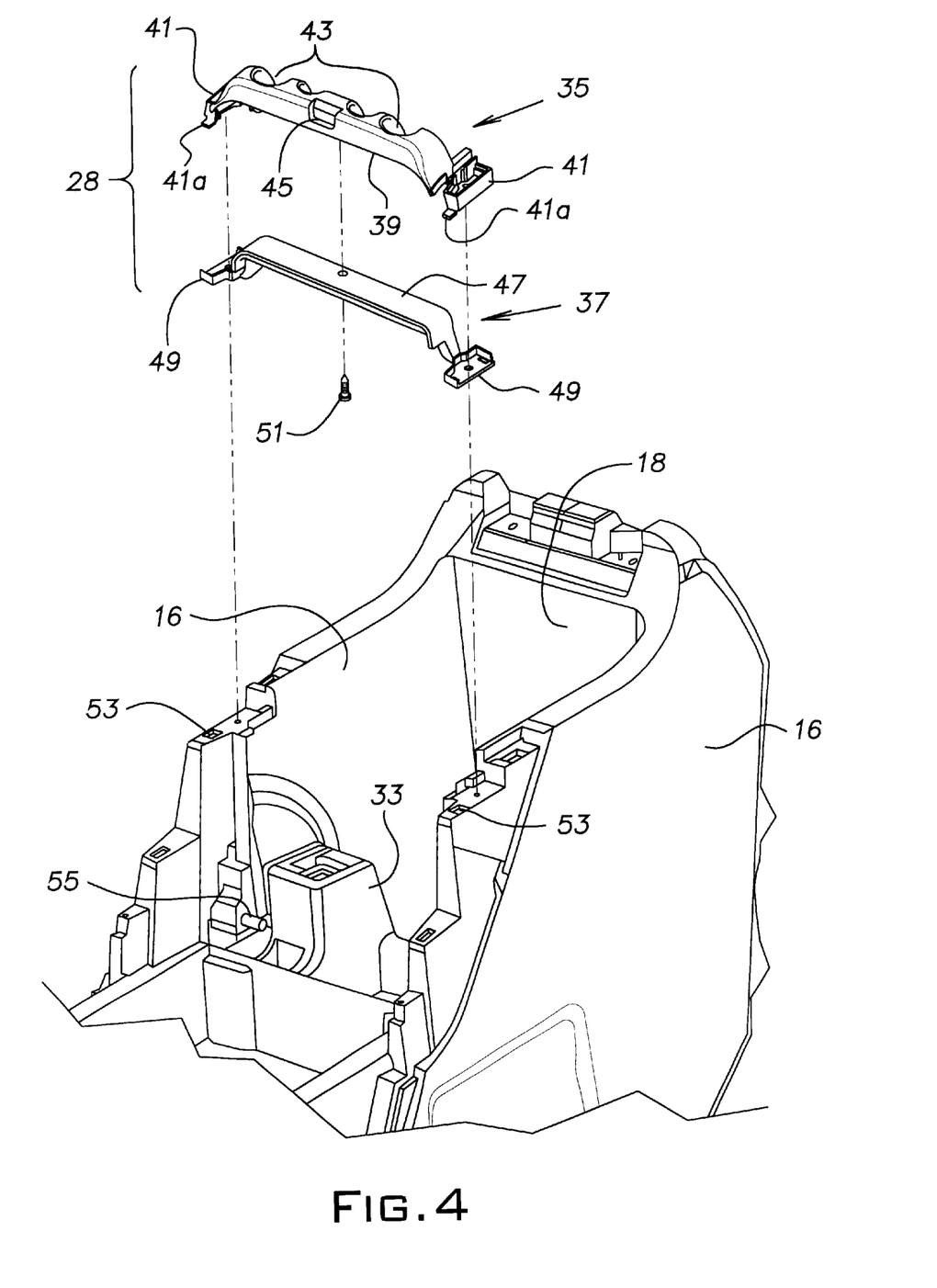
FIG. 4 is an exploded perspective view showing a bar member assembly and the center console with the front panel assembly and upper lid removed.
Figure 5:
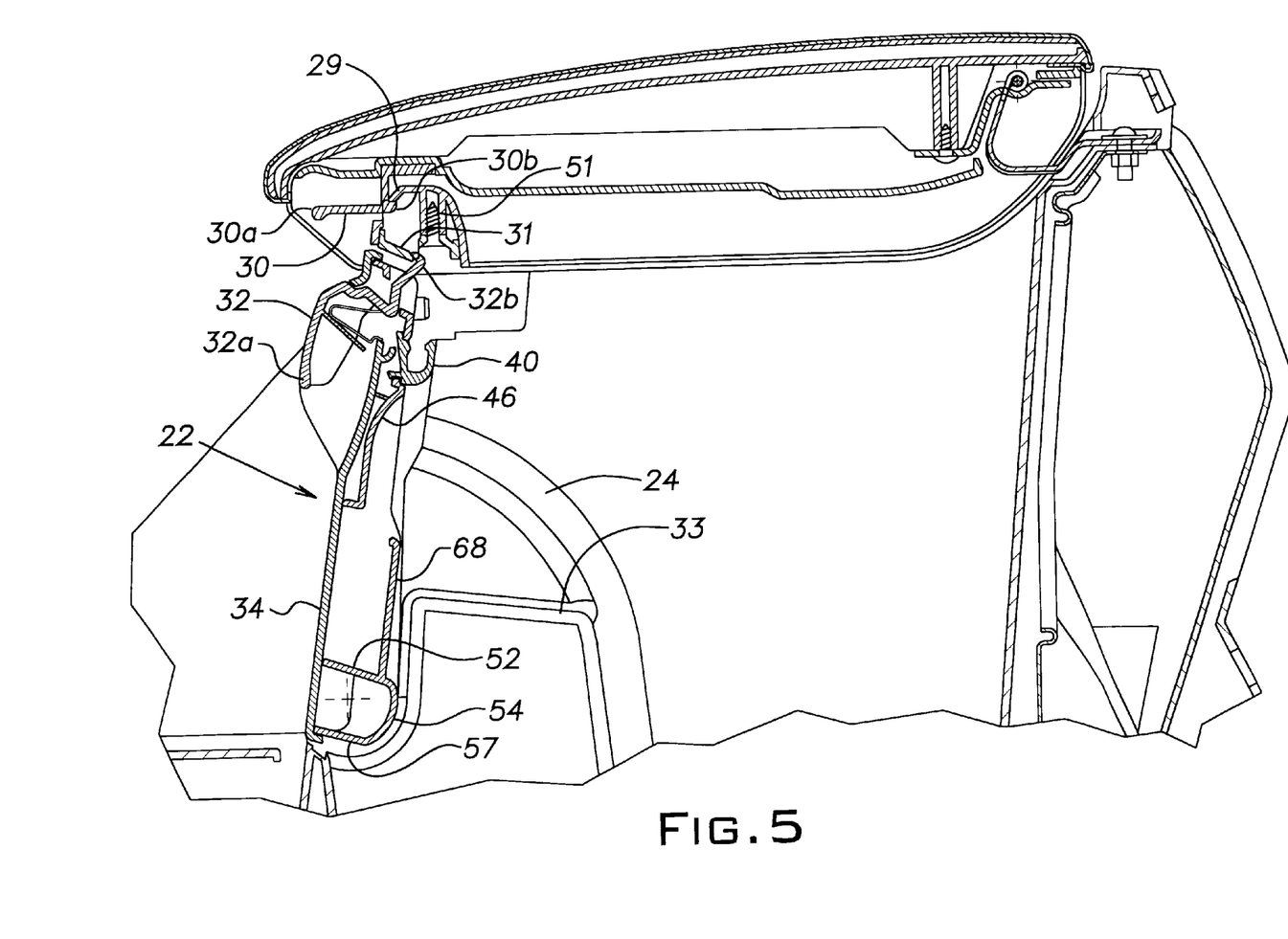
FIG. 5 is a cross-sectional view of the center console with the upper lid and front panel assembly in a closed position.
Figure 6:
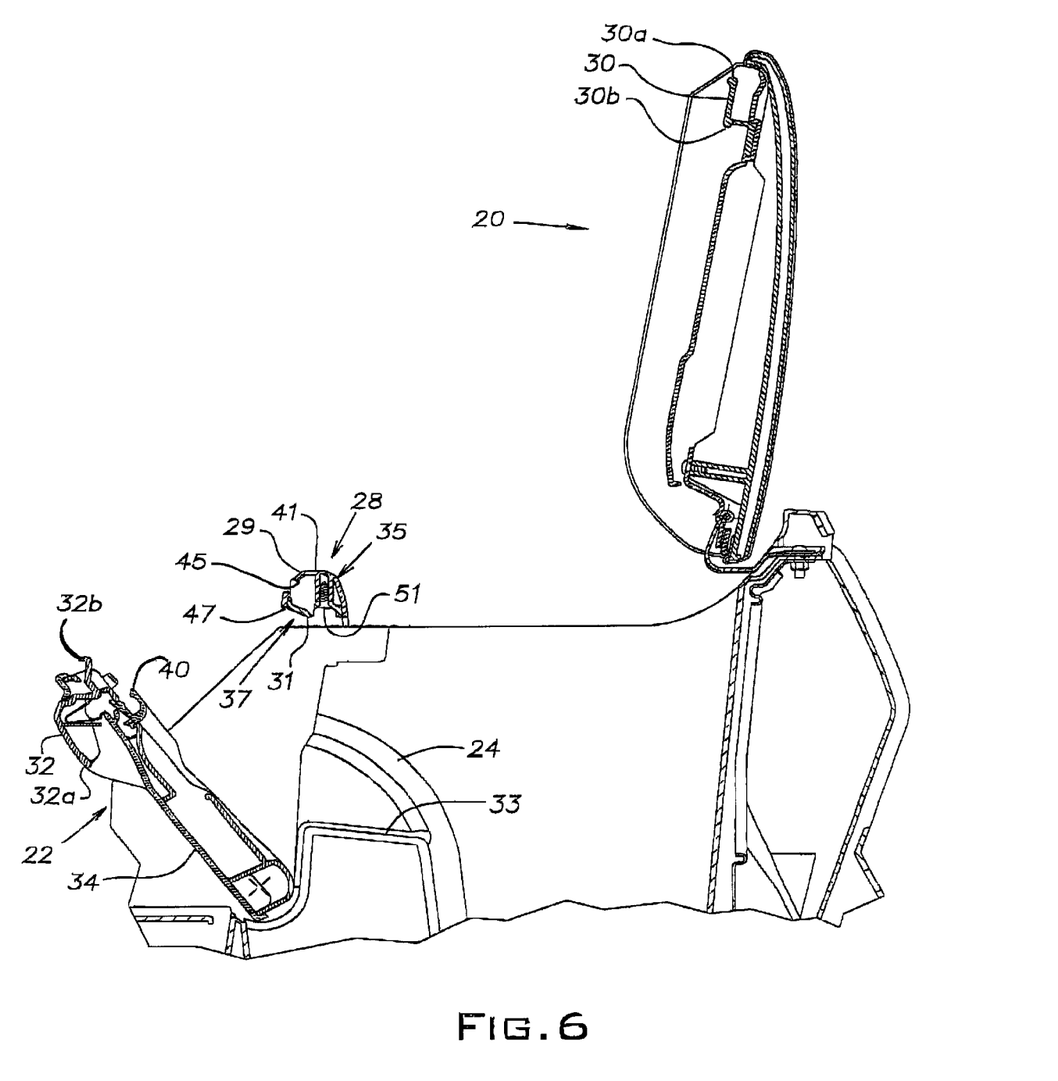
FIG. 6 is a cross-sectional view of the center console with the upper lid and front panel assembly in the open position; and, FIG. 7 is a cross-sectional view through the front panel assembly, hinge arm, and a portion of the console sidewall.

With reference to FIGS. 4–6, the bar member assembly 28 is shown to include an upper bar member 35 and a lower bar member 37. The upper bar member 35 has an elongated body 39 and a pair of mounting wings 41. The elongated body 39 has an inverted U-shape in cross section, and provides a series of coin receptacles 43 on a rearwardly facing side thereof, and has an opening 45 at a front side thereof that provides the first catch 29 that receives the latch 30 of the upper lid 20. Each of the mounting wings 41 defines a forwardly facing mounting tab 41 a and a downwardly facing receptacle.

The lower bar member 37 also has an elongated body 47 and a pair of mounting wings 49. The lower bar mounting wings 49 are received within the receptacles provided by the upper bar member mounting wings 41 while the elongated body 47 is received within the upper bar member elongated body 39. As such, the upper and lower bar members 35, 37 nest together to define a relatively rigid and unitary bar member assembly 28. A rearwardly facing edge of the lower bar member elongated body 47 provides the second catch 31 that the front panel assembly latch 32 engages to secure the front panel assembly 22 in the closed position.

For assembly, the lower bar member mounting wings 49 are inserted into the receptacles of the upper bar member mounting wings 41, and the lower bar member elongated body 47 is disposed downwardly adjacent the upper bar member elongated body 39 and secured thereto by a screw 51. The bar member assembly 28 is then secured to the console sidewalls 16 by inserting the mounting wings 49 into accommodating openings 53 in an upper surface of the sidewalls 16, rotating the mounting wings 49 into engagement with the sidewalls, and then inserting a screw through the upper and lower bar member mounting wings 41, 49 and into the sidewall 16.

The rear wall 18 has the upper lid 20 pivotally secured thereto, and may optionally have controls disposed on a rearward facing surface thereof to permit rear seat passengers to control operation of the rear HVAC system, as is known in the art. The upper lid 20 is pivotally movable between the closed position covering the storage compartment (FIGS. 1 and 5) and an open position wherein the interior of the storage compartment is vertically accessible (FIGS. 2 and 6). A forward end of the upper lid 20 includes the latch 30 to releasably secure the upper lid to the bar member assembly 28, described briefly hereinbefore. Similarly, the front panel assembly 22 is pivotally movable between the closed position covering the front of the storage compartment (FIGS. 1 and 5) and an open position wherein the interior of the storage compartment, and items disposed on the rear of the front panel assembly, are accessible. As will be described further hereinafter, the front panel assembly 22 is adapted to be retained in a partially open position (FIGS. 2 and 6) or a full open position in addition to the closed position.

The front panel assembly 22 includes a cover member 34 and a front panel member 36. The cover member 34 is preferably vibration welded or otherwise mechanically secured to the front panel member 36 and serves as the forwardly facing surface of the front panel assembly 22, as is best seen in FIGS. 1 and 4.

Figure 3:
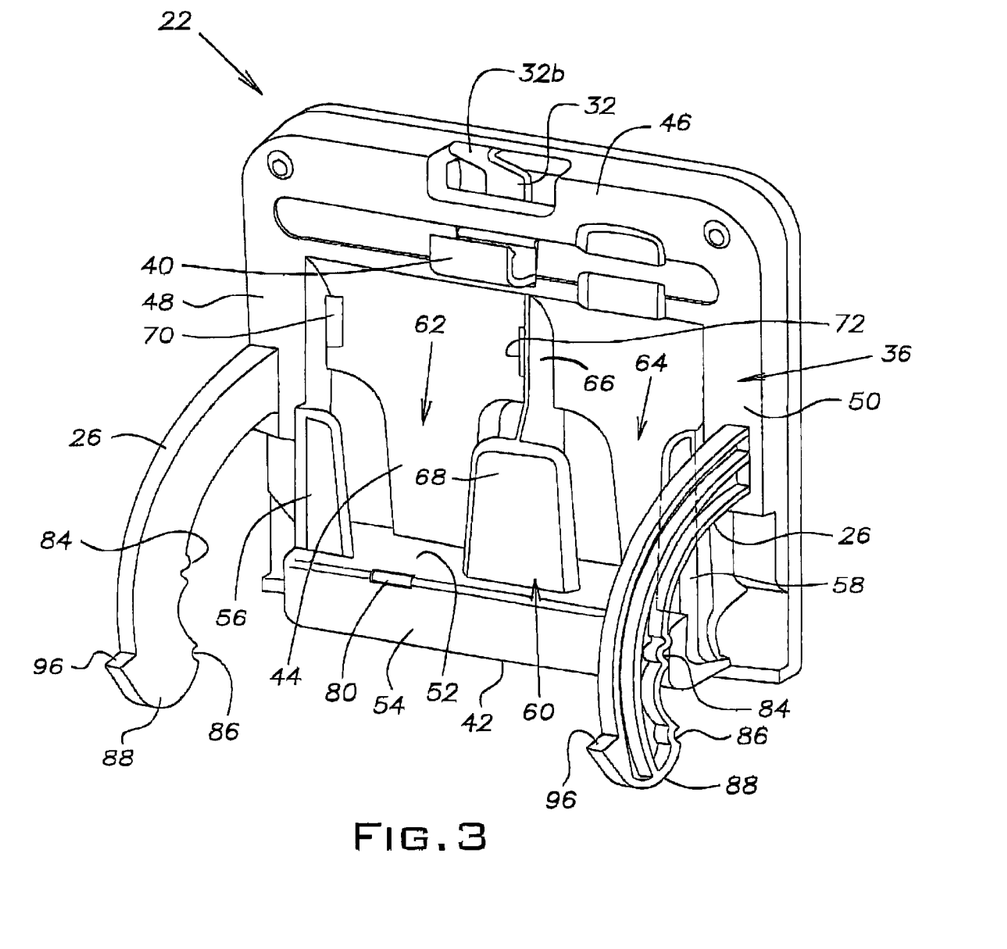
FIG. 3 is a rear perspective view of a front panel assembly.

With reference to FIG. 3, the front panel member 36 includes the pair of rearwardly extending hinge arms 26, a writing instrument holding clip 40, and the latch 32. A rearwardly facing surface of the front panel member 36 includes a recessed center portion 44 that is surrounded by a pivot member 42, a raised upper portion 46, and first and second raised lateral portions 48, 50, as illustrated. The recessed center portion 44 has relatively large openings formed therein through which a rear surface of the cover member 34 is visible.

The pivot member 42 is disposed at a bottom of the front panel member 36 and rides upon a pair of hinge pins 55 (one shown, FIG. 4) that extend inwardly from the console sidewalls 16. The pivot member 42, which is generally C-shaped in cross section, includes a generally planar upper wall 52, a generally planar lower wall 57, and a curved rear wall 54. A forwardly directed opening of the pivot member 42 is covered by the cover member 34 and receives the hinge pins 55.

The pivot member upper wall 52 projects rearwardly from the recessed center portion 44 and cooperates with the raised portions 46, 48, 50, first and second lateral wall members 56, 58, and a divider wall member 60 to define first and second storage receptacles 62, 64. The first and second lateral wall members 56, 58 are generally L-shaped in cross section, and include a first portion extending rearwardly from the associated lateral raised portion 48, 50 and a second portion extending generally perpendicular to the first portion and inwardly toward the other lateral wall member. The lower ends of the lateral wall members 56, 58 are integral with the pivot member upper wall 52.

The divider wall member 60 is disposed intermediate the first and second lateral wall members 56, 58, and extends rearwardly from the front panel member 36 and upwardly from the pivot member upper wall 52. The divider wall member 60 includes a partition member 66 extending rearwardly from the front panel member 36 and a retaining arm 68 extending laterally from a distal end of the partition member 66 toward both the lateral wall members 56, 58. The retaining arm 68 is generally equal in length or height to that of the lateral wall members 56, 58 and is integral with the pivot member upper wall 52. The partition member 66 extends upwardly beyond the lateral wall members 56, 58 and the retaining arm 68 so as to traverse the recessed center portion 44 and engage a lower edge of the raised upper portion 46, as illustrated.

The first storage receptacle 62 is defined by the space subtended by the first lateral wall member 56, the first raised lateral portion 48, the raised upper portion 46, the divider wall member 60, the front panel member 36, and the upper wall 52 of the pivot member 42. Similarly, the second lateral wall member 58, the second raised lateral portion 50, the raised upper portion 46, the divider wall member 60, the front panel member 36, and the upper wall 52 of the pivot member 42 subtend the second storage receptacle 64. Preferably, the divider wall member 60 is not disposed in the center of the front panel member 36 and, as such, the first storage receptacle 62 is relatively larger than the second storage receptacle 64. The storage receptacles 62, 64 are adapted to hold small items, such as paper pads, etc.

As will be apparent from the following discussion, the front panel member 36 defines a series of mounting openings 70, 72, 80 that are adapted to receive mounting tabs (not shown) extending from a phone holder 81 (FIG. 2). Insofar as the phone holder is not the subject of the present invention, and since numerous phone holders may be used in conjunction with the front panel assembly 22, the phone holder will not be further discussed hereinafter.

As noted previously, the hinge arms 26 are curved and extend rearwardly from the rear surfaces of the first and second raised lateral portions 48, 50 of front panel member 36. The hinge arms 26 are slidably received within the arcuate pockets 24 provided by the console sidewalls 16. Each of the hinge arms 26 includes first and second downwardly or forwardly extending detents 84, 86 and an enlarged distal end 88.

The first detents 84 are located at a position along the length of the hinge arms 26 such that the front panel assembly 22 may be maintained in a partially opened position (i.e., a position between full open and full closed positions). The first detents 84 are preferably disposed such that the front panel assembly 22 is held at about a 60° angle (FIGS. 2 and 6), with the full closed position being 90° (FIGS. 1 and 5) and the full open position being about 0°.

The second detents 86 are arranged at or near the distal end 88 of the hinge arms 26 and are provided to maintain the front panel assembly 22 generally at the full open position. The enlarged distal ends 88 of the hinge arms 26 prevent the hinge arms from being inadvertently removed from the arcuate pockets 24. Naturally, additional detents may be provided, or the position of the detents 84, 86 may be altered, to adjust the angular orientation of the front panel assembly 22 when partially opened.

The console sidewalls 16 include elements that cooperate with the hinge arms' detents 84, 86 to releasably maintain the front panel assembly 22 in the desired orientation. More specifically, and with reference to FIG. 7, the closed front panel assembly 22 and a portion of an associated sidewall 16 is shown in cross section through one of the hinge arms 26. The hinge arm 26 extends through the opening 90 in the sidewall 16, which provides a flexible tab 92 and a stop surface 94 adjacent the opening 90. The flexible tab 92 is secured relatively below the opening 90 while the stop surface 94 is relatively above the opening 90.

When the front panel assembly 22 is pivoted forwardly to an open position, the first detents 84 engage the flexible tab 92 to releasably retain the front panel assembly 22 in a partially opened position, as shown in FIG. 2. The tabs 92 are flexible or resilient so that the engagement between the tabs 92 and the first detents 84 may be overcome upon application of sufficient force to either close the front panel assembly 22 or further open the front panel assembly 22.

Figure 7:
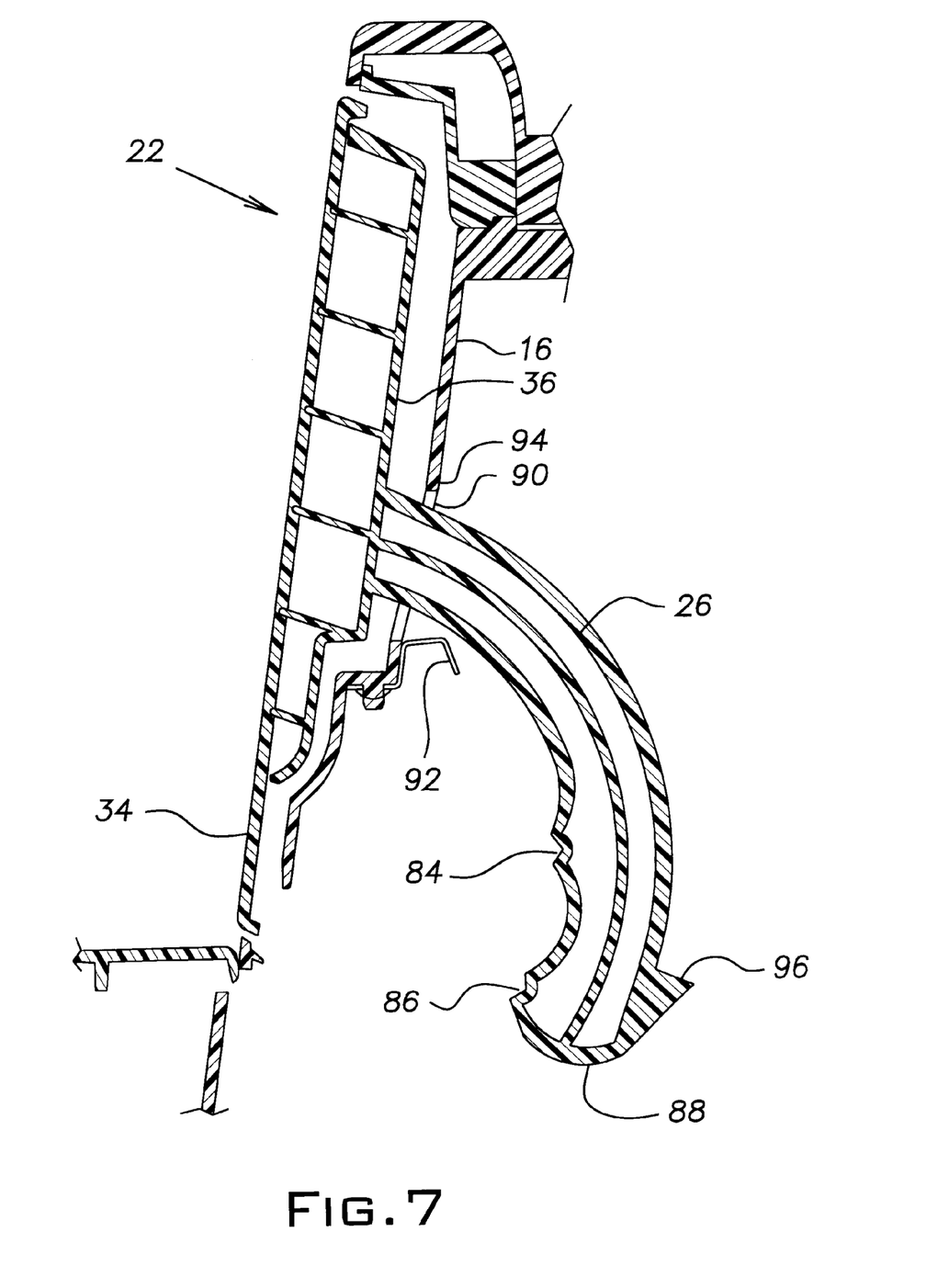

The second detents 86 are disposed at the distal enlarged end 88 of the hinge arms 26 and similarly engage the flexible tabs 92 when the front panel assembly 22 is completely opened. The engagement between the second detents 86 and the flexible tabs 92 may also be overcome to permit the front panel assembly 22 to move from the full open position toward the closed position. The enlarged distal end 88 provides a stop 96 that extends away from the distal end 88 and engages the stop surface 94 to prevent the front panel assembly from being opened beyond the full-open position (i.e., wherein the front panel is relatively horizontal).

The writing instrument holding clip 40, which is provided on the raised upper portion 46 relatively above the first and second storage receptacles 62, 64, is aligned with a groove. A writing instrument, such as a pen or pencil (not shown), may be snap-fitted between arms of the clip 40, and partially received in the groove. A pair of recesses may be included in the upper raised portion to permit the user to grasp and remove the writing instrument from the clip 40.

The front panel assembly latch 32 also extends through the front panel member 36, and is located relatively above the writing instrument holding clip 40. The latch 32 is adapted to snap over a rearwardly facing edge of the lower bar member, which serves as the second catch 31 described hereinbefore.

The interaction between the bar member assembly 28 and the latches 30, 32 is shown best in FIGS. 5 and 6. With regard to the upper lid 20, the latch 30 is pivotal and has an outer end 30a and an inner end 30b. The outer end 30a is pulled upwardly by a user to move the inner end 30b out of engagement with the first catch 29 of the upper bar member 35. More specifically, upward movement on the latch outer end 30a moves the latch inner end 30b downwardly to free the latch 30 from engagement with the first catch 29 and permit the upper lid 20 to be opened. When the upper lid 20 is closed the inner end 30b of the latch 30 will snap into engagement with the first catch 29 without any intervention by the user.

With regard to the front panel assembly 22, the latch 32 extends through the front panel assembly 22 so as to have an exterior portion 32a and an interior portion 33b. The exterior portion 32a is positioned for engagement by the user, while the interior portion 32b is received over the rearwardly facing edge of the lower bar member 37 that serves as the second catch 31. When the user pulls the exterior portion 32a upwardly the interior portion 32b is rotated free of the second catch 31 to permit the front panel assembly 22 to be opened. When the front panel assembly 22 is closed, the inner portion 32a snaps over the second catch 31 without any intervention by the user.

The center console 10 of the present invention offers several advantages over the state of the art. First, the console 10 provides an upper lid 20 that is movable to gain access to the storage space of the console and a front panel assembly 22 that is movable to conveniently access items stored thereon. The front panel assembly 22 provides storage for a mobile phone and other items in a position that does not significantly affect the available storage space of the console. Moreover, the front panel assembly 22 is easily opened, and retained in a partially opened position, to give the user convenient access to a mobile phone disposed thereon. The bar member 28 assembly provides a rigid support of the upper lid 20 and front panel assembly 22, and integrally provides the pair of catches 29, 31 that are independently engaged by the upper lid and front panel assembly latches 30, 32 to permit the lid 20 and front panel assembly 22 to be selectively opened and closed. The console also provides the rearward and middle storage spaces 17, 19 that are adapted to releasably receive the cup holder 14, while having a sliding cover 15 to provide more privacy for items received in the forward and middle storage spaces 19, 21.

While the present invention has been specifically described herein, it is considered apparent that numerous modifications, substitutions, and rearrangements of parts may be resorted to without departing from the scope and spirit of the present invention. Therefore, the invention is not limited to the specific structural embodiments described herein, but rather is only to be defined by the claims appended hereto.

What is claimed is:

1. A center console assembly, comprising:
    a console including a pair of sidewalls and a rear wall connected to said sidewalls;
    a bar member assembly disposed between said sidewalls;
    an upper lid pivotally secured to said console, said upper lid having a latch that is releasably secured to a first catch provided by said bar member assembly; and
    a front panel assembly pivotally secured to said console, said front panel assembly having a latch that is releasably secured to a second catch provided by said bar member assembly, wherein said bar member assembly includes an upper bar member and a lower bar member, said lower bar member being nested with said upper bar member.

2. The center console assembly according to claim 1, wherein said console includes an electrical socket that is disposed relatively behind said front panel assembly.

3. The center console assembly according to claim 1, wherein said upper lid is pivotally secured to said rear wall and said front panel assembly is pivotally secured to said sidewalls.

4. The center console assembly according to claim 1, wherein said bar member assembly defines a plurality of receptacles that are adapted to receive coins.

5. The center console assembly according to claim 1, wherein said upper bar member provides said first catch and said lower bar member provides said second catch.

6. A center console assembly, comprising:
    a console including a pair of sidewalls and a rear wall connected to said sidewalls;
    a bar member assembly disposed between said sidewalls;
    an upper lid pivotally secured to said console, said upper lid having a latch that is releasably secured to a first said bar member assembly; and
    a front assembly pivotally secured to said console, said front panel assembly having a latch that is releasably secured to a second catch provided by said bar member assembly, and wherein said front panel assembly includes a front panel member having a pair of hinge arms, each of said arms extending through an opening in an associated one of said pair of sidewalls.

7. The center console assembly according to claim 6, wherein said hinge arms and said sidewalls cooperate to define means for releasably holding said front panel assembly in a partially opened position.

8. The center console assembly according to claim 7, wherein each of said hinge arms have a first detent disposed at a predetermined position along a length said hinge arms, and said sidewalls have a tab secured thereto adjacent said opening, said first detents engaging said tab to retain said front panel assembly in a partially opened position.

9. The center console assembly according to claim 8, wherein each of said hinge arms further comprise second detents adjacent a distal end of said hinge arms, said second detents engaging said tabs to retain said front panel assembly in a full open position.

10. The center console assembly according to claim 9, wherein said bar member assembly defines a plurality of receptacles that are adapted to receive coins.

11. The center console assembly according to claim 10, wherein said bar member assembly includes an upper bar member and a lower bar member, said lower bar member being nested with said upper bar member.

12. The center console assembly according to claim 11, wherein said upper bar member provides said first catch and said lower bar member provides said second catch.

13. The center console assembly according to claim 12, wherein said upper bar member includes an elongated body having an opening therein that serves as the first catch and said lower bar member includes an elongated body that is received within the elongated body of the upper member and has a rear surface that serves as the second catch.

14. The center console assembly according to claim 13, wherein said upper bar member has a pair of mounting wings, said mounting wings defining a receptacle, and wherein said lower bar member has a pair of mounting wings that are received within the receptacle of the upper bar member mounting wings.

15. A center console assembly defining a plurality of storage spaces and including a removable cup holder, wherein:
    first and second of said plurality of storage spaces are adapted to receive the cup holder; and,
    a sliding cover is movable relative to said plurality of storage spaces and is adapted to selectively cover and reveal said second storage space and a third storage space.

16. The center console according to claim 15, further comprising:
    a console disposed adjacent said first storage space and including a pair of sidewalls and a rear wall connected to said sidewalls;
    a bar member assembly disposed between said sidewalls;
    an upper lid pivotally secured to said console, said upper lid having a latch that is releasably secured to a first catch provided by said bar member assembly; and,
    a front panel assembly pivotally secured to said console, said front panel assembly having a latch that is releasably secured to a second catch provided by said bar member assembly.

17. The center console assembly according to claim 16, wherein said console includes an electrical socket that is disposed relatively behind said front panel assembly.

18. The center console assembly according to claim 17, wherein said upper lid is pivotally secured to said rear wall and said front panel assembly is pivotally secured to said sidewalls, said front panel assembly at least partially covering said first storage space when said front panel assembly is in an open position.

19. The center console assembly according to claim 18, wherein said bar member assembly defines a plurality of receptacles that are adapted to receive coins.

20. The center console assembly according to claim 19, wherein said bar member assembly includes an upper bar member and a lower bar member, said lower bar member being nested with said upper bar member.

21. The center console assembly according to claim 20, wherein said upper bar member provides said first catch and said lower bar member provides said second catch.

22. The center console assembly according to claim 21, wherein said front panel assembly includes a front panel member having a pair of hinge arms, each of said hinge arms extending through an opening in an associated one of said pair of sidewalls, and wherein said hinge arms and said sidewalls cooperate to define means for releasably holding said front panel assembly in a partially opened position.

23. The center console assembly according to claim 22, wherein each of said hinge arms have a first detent disposed at a predetermined position along a length said hinge arms, and said sidewalls have a tab secured thereto adjacent said opening, said first detents engaging said tab to retain said front panel assembly in a partially opened position.

24. The center console assembly according to claim 23, wherein each of said hinge arms further comprise second detents adjacent a distal end of said hinge arms, said second detents engaging said tabs to retain said front panel assembly in a full open position.

25. The center console assembly according to claim 24, wherein said upper bar member includes an elongated body having an opening therein that serves as the first catch and said lower bar member includes an elongated body that is received within the elongated body of the upper member and has a rear surface that serves as the second catch.

26. The center console assembly according to claim 25, wherein said upper bar member has a pair of mounting wings that each define a receptacle, and wherein said lower bar member has a pair of mounting wings that are received within the receptacle of the upper bar member mounting wings.

* * * * *

UNITED STATES PATENT AND TRADEMARK OFFICE
CERTIFICATE OF CORRECTION

PATENT NO. : 6,616,206 B2
DATED : September 9, 2003
INVENTOR(S) : Luginbill et al.

It is certified that error appears in the above-identified patent and that said Letters Patent is hereby corrected as shown below:

Column 3,
Line 57, delete "41 a" and insert -- 41a --.

Column 7,
Line 67, before "said", insert -- catch provided by --.

Column 8,
Line 6, after "said", insert -- hinge --.

Signed and Sealed this

Sixteenth Day of December, 2003

JAMES E. ROGAN
*Director of the United States Patent and Trademark Office*